(12) United States Patent
Van Gils et al.

(10) Patent No.: US 12,437,130 B2
(45) Date of Patent: Oct. 7, 2025

(54) LICENSE-FREE SURROGATE MODEL GENERATION

(71) Applicant: The Boeing Company, Chicago, IL (US)

(72) Inventors: Pieter Van Gils, Madrid (ES); Can Onur, Munich (DE)

(73) Assignee: The Boeing Company, Arlington, VA (US)

( * ) Notice: Subject to any disclaimer, the term of this patent is extended or adjusted under 35 U.S.C. 154(b) by 990 days.

(21) Appl. No.: 17/459,636

(22) Filed: Aug. 27, 2021

(65) Prior Publication Data

US 2022/0122207 A1   Apr. 21, 2022

(30) Foreign Application Priority Data

Oct. 21, 2020 (EP) .................................... 20382916

(51) Int. Cl.
  *G06F 30/20*   (2020.01)
  *G06F 21/10*   (2013.01)
  *G06Q 40/12*   (2023.01)

(52) U.S. Cl.
  CPC ............ *G06F 30/20* (2020.01); *G06F 21/105* (2013.01); *G06Q 40/12* (2013.12)

(58) Field of Classification Search
  CPC ........ G06F 30/00; G06F 30/20; G06F 21/105; G06F 21/12; G06Q 40/12; G05B 2219/25298; G05B 17/02
  USPC .......................................................... 703/2
  See application file for complete search history.

(56) References Cited

U.S. PATENT DOCUMENTS

2020/0242497 A1*  7/2020  Shahkarami ........... G06N 20/00

OTHER PUBLICATIONS

Stephens, D.W. et al., "Surrogate Based Sensitivity Analysis of Process Equipment", Dec. 9-11, 2009, Seventh International Conference on CFD in the Minerals and Process Industries, CSIRO Australia. (Year: 2009).*
Bravo, Sergio A., "Development of a GLTF File Importer for Unreal Engine 4", 2019, Sheffield Hallam University. (Year: 2019).*
Communication Pursuant to Article 94(3) EPC, European Application No. 20382916.3, mailed Aug. 22, 2024, 6 pages.
European Search Report for European Patent Application No. 20382916.3 dated Mar. 23, 2021, 8 pages.
(Continued)

*Primary Examiner* — Cedric Johnson
(74) *Attorney, Agent, or Firm* — Harrity & Harrity, LLP

(57) ABSTRACT

A method, node, and computer-readable medium are provided to convert a proprietary model to a tool-agnostic surrogate model using a functional mockup interface (FMI) standard. A proprietary model is received as a functional-mockup unit (FMU) An automated dataset generation is performed on the FMU to create input/output datasets based on design of experiments and input requirements. Steady-state operational-points are determined. The tool-agnostic surrogate model is generated based on the input/output datasets and the steady-state operational-points. The tool-agnostic surrogate model is output as an output FMU model that is free of licensing requirements of a license for the proprietary model. The tool-agnostic surrogate model may be a steady-state surrogate model, a dynamic surrogate model, or a combination thereof.

20 Claims, 5 Drawing Sheets

(56) References Cited

OTHER PUBLICATIONS

Anonymous, "Surrogate model—Wikipedia", Jun. 24, 2020, XP055785566, Retrieved from the Internet: URL:https://en.wikipedia.org/w/index.php?title=Surrogate model&oldid=964251223 [retrieved on Mar. 15, 2021], 5 pages.

* cited by examiner

LICENSE-FREE SURROGATE MODEL GENERATION

TECHNICAL FIELD

The present disclosure relates generally to autonomous model generation, and more particularly to methods and related devices supporting autonomous model generation.

BACKGROUND

Engineering models are often used to represent product behavior and system behavior in many product designs including requirement verification and validation. These models are being used in more aspects of product design. The scale and complexity of the models are also increasing to more accurately capture the system behavior.

Most engineering designs are developed using proprietary modeling tools that is licensed to the model developer. The models are usually developed with their application in mind and how the model is used has a direct impact on model quality. For instance, to develop system requirements and product requirements, a thorough system analysis requires a high-fidelity multi-physics model to be developed.

A problem that may arise using the modeling software when behavioral models are computationally expensive to use for real-time applications or faster than real-time applications such as hardware in the loop testing, batch simulations for system design/analysis, pilot in the loop testing, etc. is the number of test runs that are needed. For example, requirement validation using batch simulation may require tens of thousands of model runs.

One way to address this problem has been using surrogate models that mimic the high-fidelity multi-physics model in a computationally efficient manner through adjusting model qualities. Surrogate modeling is a technique of creating fast-running approximations of complex time-consuming computer simulations. The surrogate models can be used in place of the high-fidelity multi-physics model for some of the computationally expensive tests.

Surrogate model creation workflow in proprietary modeling tools create surrogate models that run faster than the original high-fidelity models for particular purposes. Multi-physics modeling tools generally are not aimed at surrogate model and those that do have surrogate modeling capability are typically limited in scope. For example, the available method of surrogate modeling may be limited to linearization of the proprietary model. A problem of using these proprietary modeling tool surrogate models in real-time is that the proprietary modeling tool requires license fees for the tools, which limit the number of models/test to the number of license seats the model developer has. This can significantly slow down the time for the number of tests that need to be run and increase cost due to the license fees. Another problem with these proprietary modeling tool surrogate models is that only surrogate models of a proprietary model that has been developed in that proprietary modeling tool can be created. Thus, a model created outside of the proprietary modeling tool such as in a different proprietary modeling tool cannot be used to create a surrogate model by the proprietary modeling tool.

SUMMARY

A method is provided to convert a proprietary model to a tool-agnostic surrogate model using a functional mockup interface (FMI). A proprietary model is received as a functional-mockup unit (FMU). Automated dataset generation is performed on the FMU to create input/output datasets based on design of experiments and input requirements. Steady-state operational-points are determined. The tool-agnostic surrogate model is generated based on the input/output datasets and the steady-state operational-points. The tool-agnostic surrogate model is output as an output FMU model that is free of licensing requirements of a license for the proprietary model.

A surrogate model node is provided and configured to convert a proprietary model to a tool-agnostic surrogate model using a functional mockup interface, FMI, standard, the surrogate model node comprising: processing circuitry; and memory coupled with the processing circuitry, wherein the memory includes instructions that when executed by the processing circuitry causes the surrogate model node to perform operations comprising: receiving a proprietary model as a functional-mockup unit, FMU; performing automated dataset generation on the FMU to create input/output datasets based on design of experiments and input requirements; determining steady-state operational-points; generating the tool-agnostic surrogate model based on the input/output datasets and the steady-state operational-points; and outputting the tool-agnostic surrogate model as an output FMU model that is free of licensing requirements of a license for the proprietary model.

A non-transitory computer-readable medium is provided including program code to be executed by processing circuitry of a surrogate model node, whereby execution of the program code causes the surrogate model node to perform operations comprising: receiving a proprietary model as a functional-mockup unit, FMU; performing automated dataset generation on the FMU to create input/output datasets based on design of experiments and input requirements; determining steady-state operational-points; generating a tool-agnostic surrogate model based on the input/output datasets and the steady-state operational-points; and outputting the tool-agnostic surrogate model as an output FMU model that is free of licensing requirements of a license for the proprietary model.

Advantages that can be achieved is that the tool-agnostic surrogate model can be run license free in real-time and as a stand-alone model. This allows multiple tests to be run in parallel without any license requirements. Thus, the number of tests that are faster than the full-fidelity proprietary model that can be run using the tool-agnostic surrogate model is not limited by any licensing fees.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4:
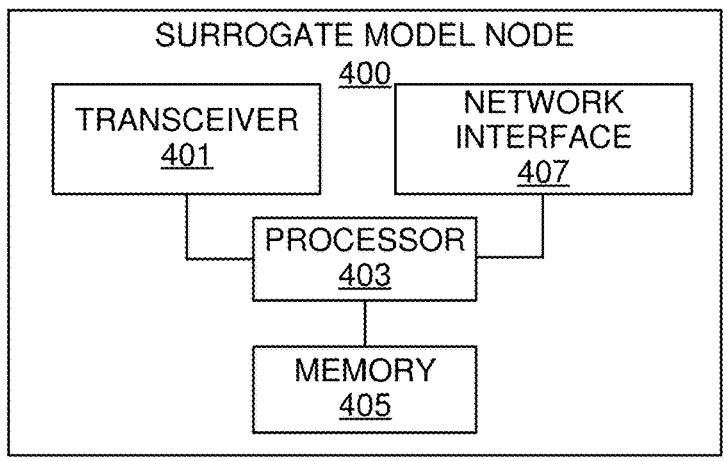
FIG. 4 is a block diagram illustrating a surrogate model node according to some embodiments of inventive concepts.

FIG. 4 is a block diagram illustrating elements of a surrogate model node 400, which may be a stand-alone node, a network node, a base station, eNodeB/eNB, gNodeB/gNB, etc.) of a Radio Access Network (RAN) configured to provide cellular or wired communication. As shown, the surrogate model node 400 may include the transceiver circuitry 401 (also referred to as a transceiver 401) including a transmitter and a receiver configured to provide uplink and downlink radio communications with other nodes and wireless terminals such as user equipment. The surrogate model node 400 may include network interface circuitry 407 (also referred to as a network interface) configured to provide communications with other nodes (e.g., with other base stations) of the RAN and/or core network, CN, and/or a local access network, LAN. The surrogate model node 400 may also include processing circuitry 403 (also referred to as a processor) coupled to the transceiver circuitry, and memory circuitry 405 (also referred to as memory 405, e.g., corresponding to a device readable medium) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the surrogate model node 400 may be performed by processing circuitry 403, network interface 407, and/or transceiver 401. For example, processing circuitry 403 may control the transceiver 401 to transmit downlink communications through transceiver 401 over a radio interface to one or more mobile terminals user equipments (UEs) and/or to receive uplink communications through transceiver 401 from one or more mobile terminals UEs over a radio interface. Similarly, processing circuitry 403 may control the network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to surrogate model nodes).

According to some other embodiments, a surrogate model node 400 may be implemented as a core network CN node without a transceiver. In such embodiments, transmission to a wireless communication device may be initiated by the network node so that transmission to the wireless communication device is provided through a network node including a transceiver (e.g., through a base station or RAN node). According to embodiments where the surrogate model node includes a transceiver, initiating transmission may include transmitting through the transceiver.

Figure 1:
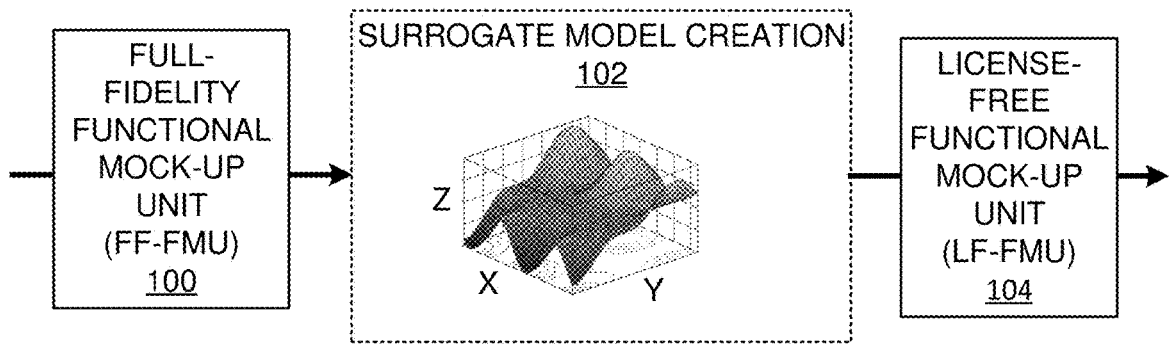
FIG. 1 is a block diagram illustrating a full-fidelity functional mock-up unit being converted to a tool-agnostic surrogate model as functional mock-up unit according to various aspects of inventive concepts.

Various aspects of the surrogate model creation to convert from a proprietary model to a tool-agnostic surrogate mode shall now be discussed. Turning to FIG. 1, the input to creating a surrogate model is generally a full-fidelity functional-mockup unit (FMU) 100 that complies with the open functional mockup interface (FMI) standard(s). This enables the surrogate model creation 102 to create and export stand-alone, license-free FMUs 104 adapted to a user's need that can be used in real-time simulations and faster than real-time simulations. The license-free models allow for simultaneous simulation runs without being limited by the number of available vendor licenses. For example, some use cases require the development of certification deliverables by running a chain of models for thousands of scenarios. The license-free surrogate models significantly speeds up creation of certification deliverables especially when one of the proprietary model tools has a limited number of licenses available to use. This can avoid costly vendor license purchases.

Figure 2:
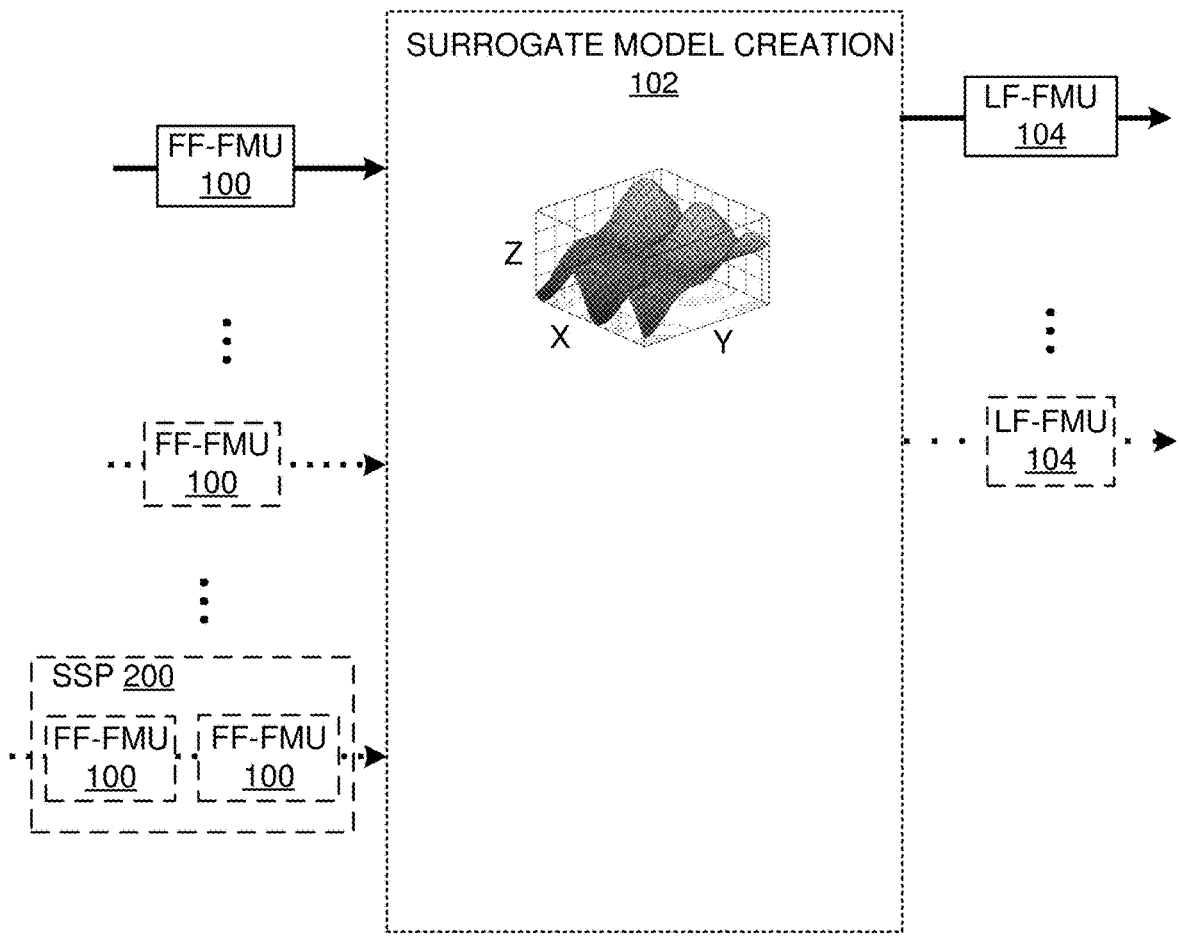
FIG. 2 is a block diagram illustrating how various full-fidelity functional mock-up units (FMUs) including System Structure and Parameterization (SSP) units containing one or more FMUs can be combined with other full-fidelity and non full-fidelity models to create one or more license-free FMUs as output including one or more SSP units containing one or more FMUS according to some aspects of inventive concepts.

Turning to FIG. 2, the input can be any number of full-fidelity FMUs (FF-FMUs) 100. For example, there can be one input FF-FMU 100 and one output license-free FMU (LF-FMU) 104, any number of parallel FMUs and/or serial FMUs as input FF-FMUs 100 and one or more output LF-FMUs 104 that can be in the same number and position as the input FF-FMUs 100 or have a different number and position than the input FF-FMUs 100 including being just a single output LF-FMU 104. According to some aspects, the input FF-FMU 100 can be a single System Structure and Parameterization (SSP) 200 unit containing one or more input FF-FMUs 100 that can be connected in serial and/or in parallel or a combination thereof. SSP is a tool independent standard to define complete systems consisting of one or more FF-FMUs 100 including parameterization of the one or more FF-FMUs that can be transferred between simulation tools. The output LF-FMU 104 can also be one or more SSP units 200 each containing one or more output LF-FMUs.

Many of the models used in engineering typically have multiple inputs and outputs (MIMO). This leads to the surrogate model generation being a multi-dimensional surrogate modeling problem, which in some instances can make the surrogate model generation difficult. In such instances, assuming that the full-fidelity model has N inputs and M outputs, the surrogate model generation can be broken down into M independent surrogate models, each having N inputs and one output.

Full-fidelity models can have discrete and/or continuous inputs. The discrete inputs may ins some instances, require a careful consideration from a surrogate modeling perspective. Design of Experiments, explained below, is a methodology for input design point generation, where different input values are combined based on the selected inputs ranges to construct a design space that needs to be explored for the surrogate modeling. The discrete inputs, in that sense, could be considered as separators clustering of the design space made up of continuous inputs. In some embodiments, the discrete inputs are excluded from the design of experiments and one surrogate model is generated for each discrete configuration. With this approach, a high number of discrete inputs could induce a scalability problem.

In the embodiments where each output of the high-fidelity model is represented by a surrogate model, the combination of the discrete inputs management and model per output may significantly increase the number of surrogate models needed for an accurate representation of the high-fidelity model of interest. For example, assume a 5 input and 3 output system is given, where two of the inputs are Booleans (binary). A procedure for generating a surrogate fidelity model from the system of interest could be as follows:

The high-fidelity model has three outputs. Each of them is going to be represented by a different surrogate model.

There are two inputs with data type Boolean. Individual DoEs should be constructed for each discrete configuration.

The discrete values of the Booleans are combined in order to represent all the possible scenarios (four different combinations) and capture the whole response of the high fidelity model.

In combination, a total of twelve surrogate models (four per each output) are needed for this system of interest.

Figure 3:
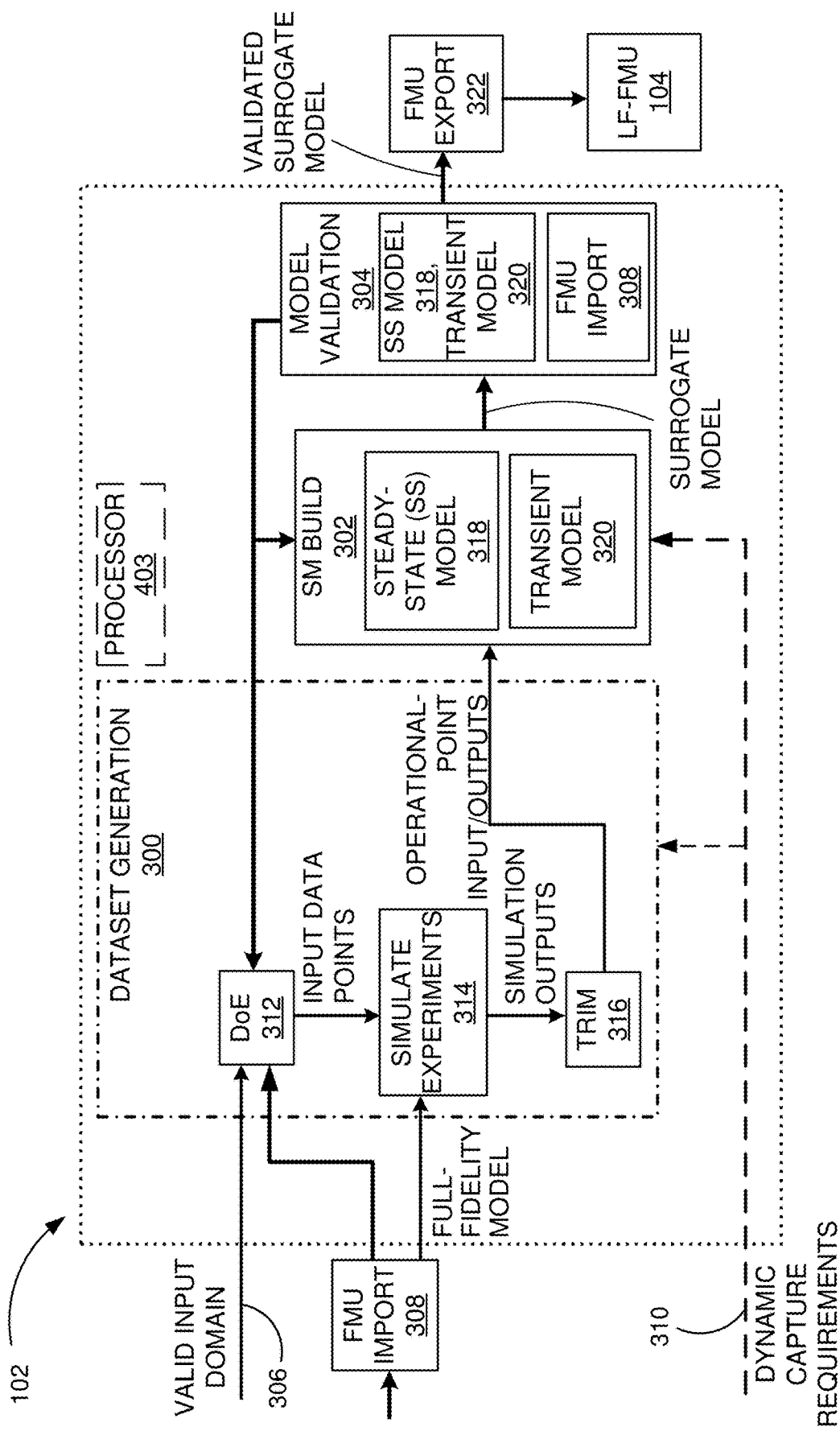
FIG. 3 is a block diagram illustrating a surrogate model creation flow according to some aspects of inventive concepts.

Turning to FIG. 3, an embodiment of the surrogate model creation 102 is illustrated. The surrogate model creation 102 is an iterative process that involves automated dataset generation 300, surrogate model build 302, and surrogate model validation 304. The input requirements to the surrogate model creation 102 include valid input domain information 306 and a FMU import 308 of the input FMU(s) 100. When the surrogate model is a dynamic model or requires a dynamic model as part of the surrogate model, the input requirements include dynamic capture requirements 310.

The valid input domain information 306 includes information such as the type of inputs (e.g., whether the input is continuous or discrete), a range of the model inputs (e.g., a continuous range or discrete values), etc. The FMU import 308 imports the high-fidelity model created by the proprietary modeling tool as an FMU. The FMU import enables the surrogate model creation to run the model in order to generate datasets (i.e., input/output datasets) used in the surrogate model creation. Additional information can be received as part of the metadata of the FMU 100 or received separately. The additional information can include a model accuracy requirement and/or a run-time performance requirement.

The dynamic capture requirements 310 provides notice that dynamic behavior is to be modeled. The dynamic capture requirements 310 can include information such as selected events and dynamic responses to the selected events that are necessary for a dynamic surrogate model to be generated for the selected events and dynamic responses to the selected events.

The dataset generation 300 includes functions implemented by processing circuitry 403 that perform design of experiments (DoE) 312, simulate experiments 314, and trim 316.

Design of experiments refers to techniques and methodologies to generate experiments to construct a dataset that captures the most predominant behaviors of the high-fidelity FMU with a minimum amount of experiment. The DoE 312 is performed to define the input data points for the input/output datasets. There are many types of DoE experiments that can be used. These can include, by way of example and not limitation, full factorial, fractional factorial, Response Surface (RS) designs, Latin hypercube designs, and D-optimal designs.

Scalability is one of the main limitations in surrogate modeling. For surrogate models with a large number of inputs (e.g., 20 or more inputs), some of the types of DoE experiments are not suitable primarily due to high computational cost. In some aspects, these types can be used in a screening phase to generate initial datasets. To determine which input data points to use from the initial dataset, a correlation analysis can be used to determine relevant and/or non relevant variables for the surrogate model to determine which inputs to keep or delete. For example, an analysis of variance (ANOVA) test is one way to quantify the significance of inputs to outputs of the simulation runs. The ANOVA test is an analysis tool that splits an observed aggregate variability found inside a data set into two parts: systematic factors and random factors. The systematic factors have a statistical influence on the given data set, while the random factors do not. The ANOVA test allows a comparison of more than two groups at the same time to determine whether a relationship exists between them. The result of the ANOVA formula, the F statistic (also called the F-ratio), allows for the analysis of multiple groups of data to determine the variability between samples and within samples. If no real difference exists between the tested groups, which is called the null hypothesis, the result of the ANOVA's F-ratio statistic will be close to 1. By selecting input variables that have a F-ratio below a threshold ratio, the relevant input data points to be used in creating the surrogate model can be determined. Once any correlation analysis testing has been done, the relevant inputs can be used in a characterization phase to create the input/output datasets for the surrogate model being created.

In various embodiments, the ANOVA test can first determine relevant (or non-relevant) terms of the selected surrogate model and then determine the relevant/principle inputs (i.e., the inputs that have a measurable impact on system response) of the surrogate model.

Table 1 provides a summary of some of the various types of DoE experiments with respect to determining/constructing the input data points and output data points.

TABLE 1

| Type of DoE | Applicability | Scalability |
| --- | --- | --- |
| Full Factorial | Better for characterization stage. Does not represent very well quadratic models or complex regions of the design space | Combinations increase exponentially with number of inputs |
| Fractional Factorial | Better for screening stage - Useful for generating limited datasets | Support up to ≈52 inputs |

TABLE 1-continued

| Type of DoE | Applicability | Scalability |
|---|---|---|
| RS Designs | Good for quadratic models where the curves or min/max zones are not well represented | Box Behnken Design: 3 to ≈30 inputs Central Composite Designs: 2 to ≈26 inputs. |
| Latin Hypercube Design | Useful for initial design or screening phases | No scalability problems |
| Optimal Designs | Good for characterization stage - Ensures better results with the same number of experiments | Depends on the order of the surrogate model (e.g., quadratic, cubic, custom) |
| Dynamic DOE | Capture the dynamics of the full fidelity model. Inputs are time varying | Decreases rapidly with the number and order of dynamic inputs |

Once the input data points have been determined, simulation experiments 314 evaluates the input data points. For steady state surrogate model generation and/or dynamic model generation, the input data points are used as inputs to the high-fidelity input FMU 100 to run steady-state simulations. The steady-state simulation runs are used by Trim 316 in various embodiments to obtain operational-point input/output data points to construct the input/output dataset provided to the surrogate model build 302.

The surrogate model build 302 creates the mathematical approximation that best fits the input/output dataset generated in DoE 312. A steady-state model 318 and/or a dynamic model 320 are built. There are different modeling methods that can be used in creating the surrogate model. These methodologies include, by way of example, and not limitation, polynomial response surface methodology (RSM), dynamic response surface methodology (DRSM), Kriging or Gaussian Process, Gradient-Enhanced Kriging (GEK), Radial Basis Function (RBF), Artificial Neural Networks, Support Vector Machines (SVM), projection pursuit regression, and systems identification.

The RSM is a statistical techniques that uses a linear or non-linear polynomial to approximate the relationship between input variables and output responses. RSMs are simple to adapt but are not flexible. Complex models can be divided into sections where each section can be approximated by a polynomial with the desired order.

The DRSM can be thought of as a generalization of the RSM in which a time-dependent model is used to capture time-varying outputs. In contrast to the RSM, the model parameters in DRSM are time-varying and do not require an excessive number of measurements. The DRSM model is used to calculate the optimal trajectory of a dataset. Because the DRSM model can capture both the linear and nonlinear dynamics of a process accurately, it can be used to develop either a linear or a nonlinear recursive dynamic model. Thus, dynamic surrogate models can be created using the DRSM. Typically, low-order polynomials are used and the dynamics are generally of low-order.

The Kriging or Gaussian Process is based on the correction of a rough approximation of a regression model by using a zero-mean Gaussian process characterized by a spatial correlation function, which estimates the similarity of two points in a parameter space. Kriging assumes that the distance or direction between sample points reflects a spatial correlation that can be used to explain variation in the surface. Kriging fits a mathematical function to a specified number of points, or all points within a specified radius, to determine the output value for each location. Kriging is generally a multistep process; it includes exploratory statistical analysis of the data, variogram modeling, creating the surface, and (optionally) exploring a variance surface. The basic idea of kriging is to predict the value of a function at a given point by computing a weighted average of the known values of the function in the neighborhood of the point. The method is mathematically closely related to regression analysis. Both theories derive a best linear unbiased estimator, based on assumptions on covariances, make use of Gauss-Markov theorem to prove independence of the estimate and error, and make use of very similar formulae. Even so, they are useful in different frameworks: kriging is made for estimation of a single realization of a random field, while regression models are based on multiple observations of a multivariate data set.

Gradient-Enhanced Kriging (GEK) is an extension of the Kriging method in which the gradient of the response with respect to the parameters is modelled, increasing the accuracy of the prediction. GEK has also the potential of reducing the number of function evaluations for the desired accuracy. GEK is generally not suitable for many sample points or many independent variables.

RBF models are interpolating functions created as linear combinations of RBFs, one for each training point. Radial Basis Functions are real-valued functions whose value depends only on the distance between the input and some fixed point. The most common RBFs used are linear, cubic or Thin Plate Spline. RBF models can typically be used to develop accurate models for complicated nonlinear functions, are suitable for a large number of variables, offer goof flexibility with relatively few calculations and high efficiency.

Artificial Neural Networks are interconnected sets of nodes that compute an activation signal based on inputs. The nodes are arranged in layers, where one layer consists of the inputs, another layer consists of the outputs, and the remaining layers are known as hidden layers. The weights of each neuron are tuned by training. Artificial Neural Networks typically have lower convergence of error versus number of training points compared to other methods, are capable of dealing with high-dimensional problems, and have relatively low computational cost.

Support Vector Machines (SVM) are generally defined as supervised learning models with associated learning algorithms that analyze data for classification and regression analysis. Support-vector models are also called Support-Vector Regressions and construct a hyperplane with a maximal margin set to separate the training data.

Linear SVM models are suitable for simply linear separable cases, whereas nonlinear SVM models are suitable for high-dimensional, complex and linearly inseparable cases. SVMs are generally good for black-box optimization.

Projection pursuit regression models adapts additive modes in that the model projects a data matrix of explanatory variables in the optimal direction before applying smoothing functions to the explanatory variables.

System identification builds mathematical models of dynamic systems based on measured data.

Table 2 provides a summary of several surrogate modeling techniques that can be used by surrogate model build 302 to build a steady-state surrogate model 318.

TABLE 2

| Surrogate Model | Applicability | Scalability |
| --- | --- | --- |
| Response Surface Method | Simple to apply but not flexible. Linear/non-linear depending on the order of the polynomial. Complex regions can be divided and each approximated with linear/quadratic terms. | No scalability problems |
| Dynamic Response Surface Method Kriging | The same as response surface but for dynamic problems. Can map complex nonlinear functions. Can be built from a relatively small number of simulations. Good option if there is noise in the response. Good option for black-box problems. | Not suitable for large numbers of inputs Due to the computational effort needed, not suitable for > +/−100 independent variables. |
| Gradient Enhanced Kriging | Not suitable for many independent variables. | Due to the computational effort needed, not suitable for > +/−100 independent variables. |
| Radial Basis Function | Often delivers accurate models for complicated nonlinear functions. | Suitable for large number of variables |
| Artificial Neural Networks | Compared to the other surrogate modeling techniques, may display slower convergence of error versus the number of training points. | Capable of dealing with significantly higher dimensional problems. Relatively computationally inexpensive to evaluate. |
| Support Vector Machines | Linear SVM models are suitable for simple linear separable cases. Nonlinear SVM models are suitable for complex and linearly inseparable cases. Good for black-box optimization. | Nonlinear SVM models are suitable for high-dimensional full-scale models. |
| Projection Pursuit Regression | Flexible model capable of approximating a wide range of functions. Capable of identifying the meaningful directions that determine function behavior and ignoring variables with minimal contribution. Capable of handling high-dimensional problems | No scalability problems. |
| Systems Identification | Suitable for capturing the systems dynamics. | Depends on the approach. |

Generally, the dynamic capture requirements are provided by a user and are received by the model build 302 via a user interface. However, in the event that the dynamic capture requirements 310 does not provide dynamic responses to selected events, the DoE 312 may run simulations on the high-fidelity input FMU 100 to capture dynamic behavior by running the simulations to provide time-dependent outputs, which may be referred to herein as input/output time series. The simulations should be initialized from a stable operating point and a perturbation signal shall be added to the input to stimulate the system model and move it from one state to another to more accurately generate the model. The simulation run-time should be long enough to provide input/output time series data that capture the dynamic response to the perturbation.

The surrogate model node 400 can use the surrogate model build 302 to generate the dynamic surrogate model 320 by selecting a mathematical expression based on an analysis of the time-series data. The presence of constant offsets, trends, delays and feedbacks in the time-series data can provide an initial guess of the mathematical model structure and its order. The surrogate model node 400 may select a transfer function or a state-space model in the initial guess. The system parameters from the mathematical model structure are adjusted in order to fit the model outputs to the measured data.

According to some aspects, the surrogate model build 302 can add a dynamic model 320 to a steady-state model 318. During operation, the processing circuitry 403 of the surrogate model node 400 executes the dynamic model 320 to obtain dynamic outputs and executes the steady-state model to obtain steady state output.

Model validation 304 validates the surrogate models 318, 320. The surrogate model node 400 validates the surrogate model by running the steady-state surrogate model 318 and/or dynamic surrogate model 320 and determining whether the output values are at or within a threshold model accuracy requirement and/or a run-time performance requirement of the imported FMU 100. The threshold model accuracy requirement may be a value, a tolerance window, etc. The run-time performance requirement may be a value, a tolerance window, etc. The value and/or the tolerance window may be specified by a user or be a default value or tolerance window.

Statistical metrics may be performed by the model validation 304 to determine accuracy of the surrogate models 318, 320. The statistical metrics, collectively known as goodness-of-fit metrics, in the context of Surrogate Modeling, refers to the measurement of the accuracy of the surrogate model with respect to its corresponding full-scale, full-fidelity model. In various embodiments, the input/output dataset is divided into a Training dataset (used to estimate the coefficients of the surrogate model) and a Validation/Test dataset, to estimate how well the model has been trained (i.e., how accurate the surrogate model 318, 320 is). These statistical metrics can include, by way of example and not limitation, sum or squared due to error (SSE), root mean squared error (RMSE), $R^2$, cross-validation, and linear reference model (LRM).

SSE measures the total deviation of the response values from the fit, or the so-called residuals. A value closer to 0 indicates that the model adapts better to the actual high-fidelity surface. RMSE estimates of the standard deviation of the random component in the data, and is defined as the square root of the mean square error (SSE). Similarly, an RMSE value closer to 0 indicates a better fit. R-square measures how successful the fit is in explaining the variation of the data. R-square can take any value between 0 and 1, with a value closer to 1 indicating that a greater proportion of variance is accounted for by the model.

Cross-validation estimates the errors by using subsets of the design points to build several sub-surrogate models. Firstly, the Leave-One-Out Cross-Validation technique consists in computing the errors of a sample point based on the surrogate model built on the subset of all the design points except that one. Similarly, K-Fold Cross-Validation technique consists in dividing the data into k subsets, each subset acts as the validation set while the k−1 rest are used as the training set. Then, the error computes the loss of a point in one fold compared to the prediction of the surrogate model built with the remaining folds.

LRM scores a surrogate model by computing the deviation between its predictions and a local linear model. It penalizes the deviation from a linear model regardless of its roughness.

The uncertainty of the solution can be quantified. Typically, two types of uncertainty should be addressed, numerical uncertainty (noise) and surrogate model uncertainty (error). These are typically estimated by means of the prediction variance of the response surface ($\sigma$). A $2\sigma$ confidence interval is often used to cover 95% of uncertainty.

During operation, the surrogate model node 400 performs surrogate modeling validation, which is typically done during two distinct phases. In the first phase, the validation of the tool can be done in terms of the accuracy. This is typically done by means of a desired goodness-of-fit metric. The user provides a threshold for a goodness-of-fit metric as a reference to validate a model. Once the surrogate model has been built, the corresponding metric is calculated and if the value is inside of the required interval, the model is validated in terms of the accuracy. If not, there are several alternatives to improve the model. One alternative is to select a different surrogate modelling technique that might be more suitable for the problem and build a different model.

Another alternative is to use the same surrogate modeling technique but with different parameters. For example, the surrogate model node 400 could start with a first order transfer function and if the first order transfer function Another alternative is to perform a new Design of Experiments in the case the original one was not good enough. This model validation is performed before exporting the surrogate model as code, binaries or FMU.

The second form of model validation is the runtime performance. Since the main objective of surrogate modelling is reducing the computational cost of a model, a desired maximum runtime for the surrogate model may be provided by a user or a default maximum runtime is used. After the surrogate model has been exported (the final "deliverable product"), the runtime must be measured and compared against the required runtime in order to make sure it is inside the desired threshold.

If the threshold model accuracy requirement and/or the run-time performance requirement is not met, the surrogate model node 400 iteratively performs automated dataset generation, determining steady-state operational-points, and/or generating the tool-agnostic surrogate model, and validating the tool-agnostic surrogate model while output data is outside of the threshold model accuracy requirement and/or the run-time performance requirement. During this process, the surrogate model node 400 may change surrogate model parameters using DoE 312 and simulate experiments 314 to obtain operational-point input/outputs, change the model type of the surrogate model using DoE 312 and surrogate model build 302, rebuild the surrogate model after being changed using surrogate model build 302 and revalidate the model via model validation 304.

Once the surrogate model 318, 320 is at or within the threshold model accuracy requirement and/or the run-time performance requirement, the surrogate model 318, 320 is exported at FMU export 322 to create the LF-FMU 104. The LF-FMU 104 runs faster than the full-fidelity FMU 100, can run as a stand-alone FMU, and does not require the license required by the full-fidelity model created by the proprietary modeling tool before it can be used. Thus, the LF-FMU 104 is a tool-agnostic surrogate model and multiple runs (e.g. hundreds or thousands) can be run in parallel.

In some embodiments, when there is lack of knowledge on the high-fidelity model responses, a screening phase can be carried out to learn the model behavior and the inputs' contribution to it. During this stage, the key variables that affect the output can be identified and a large number of inputs can be present. The surrogate model node 400 may select a main effects (first order). For this set of design points, the full fidelity model is evaluated and the analysis will lead to identifying the key variables.

A characterization phase starts once the contribution of each input variable to the high-fidelity model responses is obtained through statistical analysis methods. In this stage, the variables that turn out to be statistically significant in the screening stage are used by the surrogate model node 400. Note that in the screening phase, the design points were selected based on a lower order model. There could be an important variable that turns out to be statistically non-significant. If a variable shows to be not important, but all knowledge indicates otherwise, that variable is still included in this phase. A set of design points is generated so that a second or third order surrogate model can be built by the surrogate model node 400.

An optimization phase has a couple of objectives. The first objective is for the surrogate model node 400 to add additional design points from the design space where the surrogate model and the full fidelity model values are very different. Typically, the surrogate model node 400 augments the design from the previous two stages to use that information to select additional design points. The second objective is to use the surrogate model to find the optimum combination of inputs that lead to the target for the output. These would include maximizing, minimizing or achieving a particular value for the target.

Figure 5:
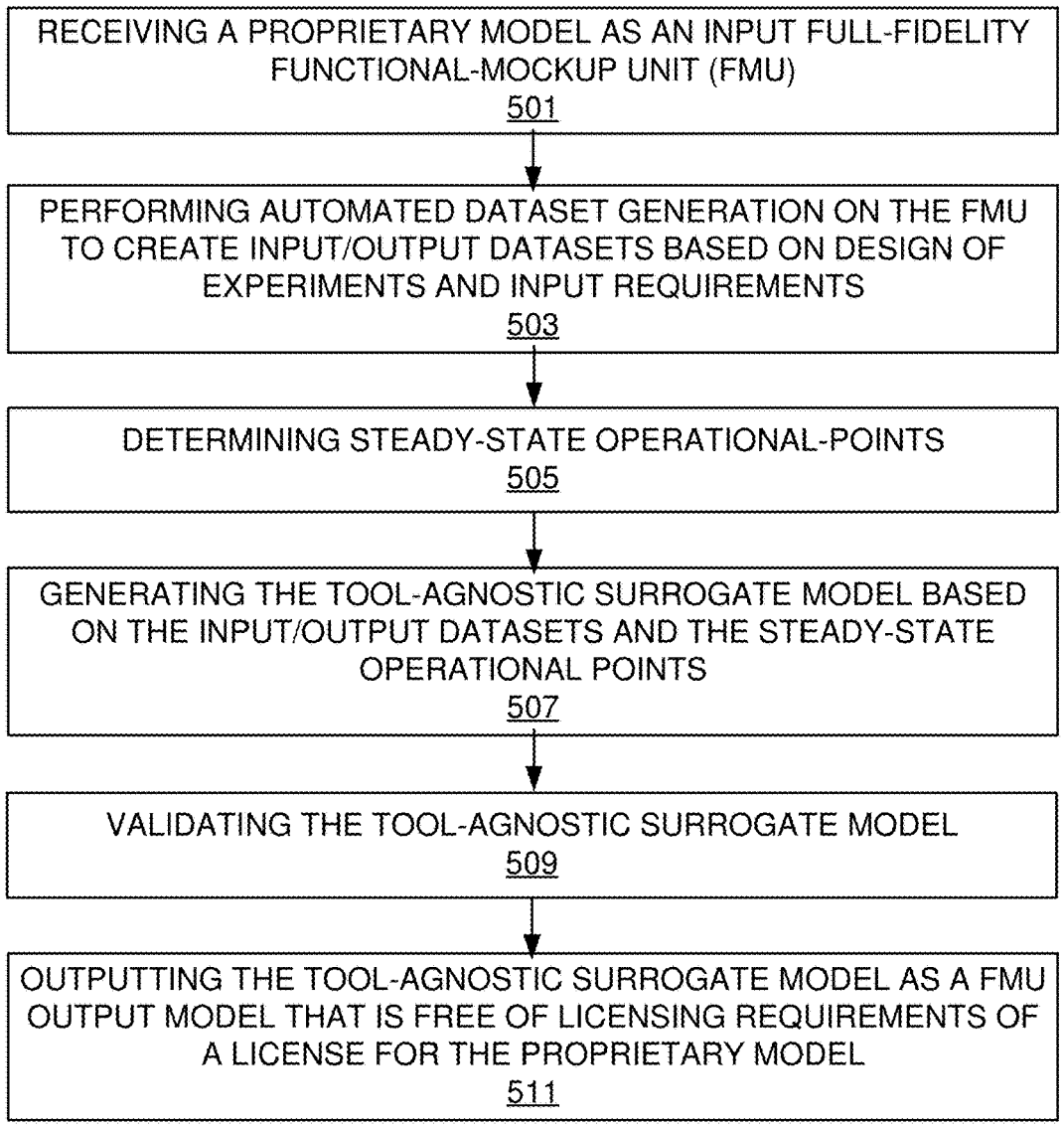
FIGS. 5-9 are flow charts illustrating operations of a surrogate model node according to various aspects of inventive concepts.

Now that the functions/components of the surrogate model creation 102 that are implemented by the processor circuitry 403 of the surrogate model node 400, the operations the surrogate model node 400 performs to convert a proprietary model to a tool-agnostic surrogate model using a functional mockup interface (FMI) standard shall now be described. Turning to FIG. 5, in block 501, processor circuitry 403 receives, via transceiver 401 and/or network interface 407, a proprietary model as an input full-fidelity functional-mockup unit (FF-FMU) 100. As described above, in some embodiments, the processing circuitry 403 may implement or instruct FMU import 308 to receive the FF-FMU 100.

Figure 6:
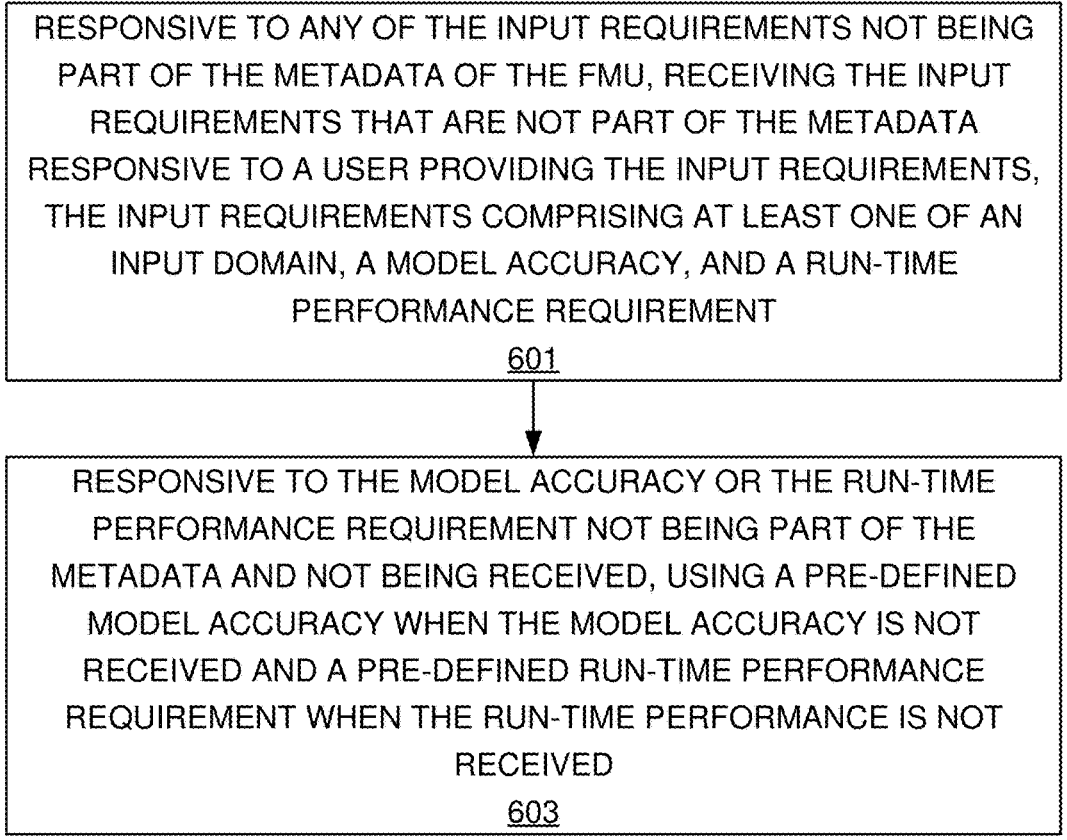

In block 503, the processing circuitry 403 performs automated dataset generation on the FF-FMU 100 to create input/output datasets based on design of experiments and input requirements. The input requirements may be part of metadata of the FF-FMU 100 and include an input domain, a model accuracy, and a run-time performance requirement. Turning to FIG. 6, in block 601, the processing circuitry 403 may, responsive to any of the input requirements not being part of metadata of the FF-FMU 100, receive, via the transceiver 401 and/or network interface 407, the input requirements that are not part of the metadata responsive to a user providing the input requirements, the input requirements including at least one of an input domain, a model accuracy, and a run-time performance requirement. Responsive to the model accuracy or the run-time performance requirement not being part of the metadata and not being received, the processing circuitry 403 may, in block 603, responsive to the model accuracy or the run-time performance requirement not being part of the metadata and not being received, use a pre-defined model accuracy when the model accuracy is not received and a pre-defined run-time performance requirement when the run-time performance requirement is not received.

The processing circuitry 403 can determine the number of inputs and outputs of the FMU 100 with the information provided as part of the FMU 100. For example, the processing circuitry 403 can analyze a model description file that comes with the FMU 100 to determine the number of inputs and outputs of the FMU 100. Based on the number of inputs and outputs of the FMU 100, the processing circuitry 403 can determine which design of experiments methodologies are feasible and/or practical to use in performing the automated dataset generation. For example, the processing circuitry 403 may use tables such as tables 1 and 2 above in determining which design of experiments methodologies are feasible and/or practical to use. In some embodiments, the processing circuitry 403 may, via network interface 407 and/or transceiver 401 send a list of DoE experiments that are feasible and/or practical to a display used by a user to enable the user to select which DoE experiment to use in performing the automated dataset generation on the FMU 100. In other embodiments, the processing circuitry 403 selects one or more of the DoE experiments that are feasible and/or practical to use.

Figure 7:
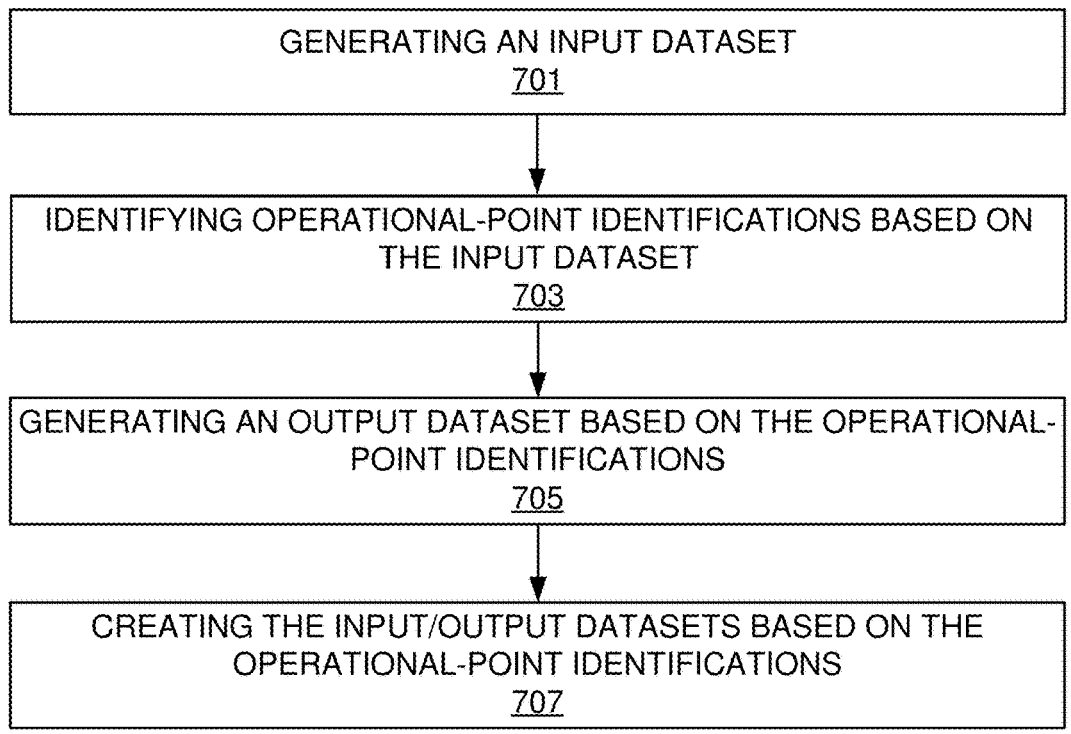

Returning to FIG. 5, in block 505, the processing circuitry 403 determines steady-state operational-points. The steady-state operational-points may be provided with the FMU 100. Turning to FIG. 7, in performing the automated dataset generation and determining steady-state operational-points, the processing circuitry 403 can generate an input dataset in block 701. The processing circuitry 403 may use DoE 312 and simulate experiments 314 to generate the input dataset as described above. In block 703, the processing circuitry 403 may identify operational-point identifications based on the input dataset. The processing circuitry 403 may in block 703 use trim 316 to identify the operational-point identifications.

In block 705, the processing circuitry 403 may generate an output dataset based on the operational-point identifications. In block 707, the processing circuitry 403 may create the input/output datasets based on the operational-point identifications.

Returning to FIG. 5, in block 507, the processing circuitry 403 may generate the tool-agnostic surrogate model 318 based on the input/output datasets and the steady-state operational-points. The processing circuitry 403 may implement and/or use surrogate model build 302 to generate the tool agnostic surrogate model 318 as described above.

In some aspects, all methods that have been deemed infeasible for the input model under consideration are excluded when generating the tool-agnostic surrogate models 318, 320.

In block 509, the processing circuitry 403 can validate the tool-agnostic surrogate model (i.e., steady-state model 318) based on the input/output datasets and the steady-state operational-points. For example, the processing circuitry 403 may run the tool-agnostic surrogate steady-state model 318 to obtain output data and determine whether or not the output data is outside of a threshold accuracy requirement and/or a run-time performance requirement.

The processing circuitry 403 may iteratively perform automated dataset generation, determining steady-state operational-points, and/or generating the tool-agnostic surrogate model, and validating the tool-agnostic surrogate model while output data is outside of at least one of a threshold model accuracy requirement and the run-time performance requirement. The threshold model accuracy requirement may be a value, a tolerance window, etc. The run-time performance requirement may be a value, a tolerance window, etc. The value and/or the tolerance window may be specified by a user or be a default value or tolerance window.

During the validation stage, the model quality (accuracy and performance) is determined for all the surrogate models created. If there is one surrogate model that satisfies the user constraints on accuracy and run-time performance, then that model will be the outcome of the Surrogate Modeling system as a LF-FMU 104. If there are multiple models that satisfy the accuracy and run-time performance requirements, then the processing circuitry 403 could either have the user select one, or automatically select the surrogate model with highest accuracy (from the subset that satisfies the run-time performance requirement.

In block 511, the processing circuitry 403 outputs the tool-agnostic surrogate steady-state model 318 as an output LF-FMU model 104 that is free of licensing requirements of a license for the proprietary model.

Various operations from the flow chart of FIG. 5 may be optional with respect to some embodiments of surrogate model nodes and related methods. Regarding methods of exemplary claim 1 (set forth below), for example, operations of block 509 of FIG. 5 may be optional.

Figure 8:
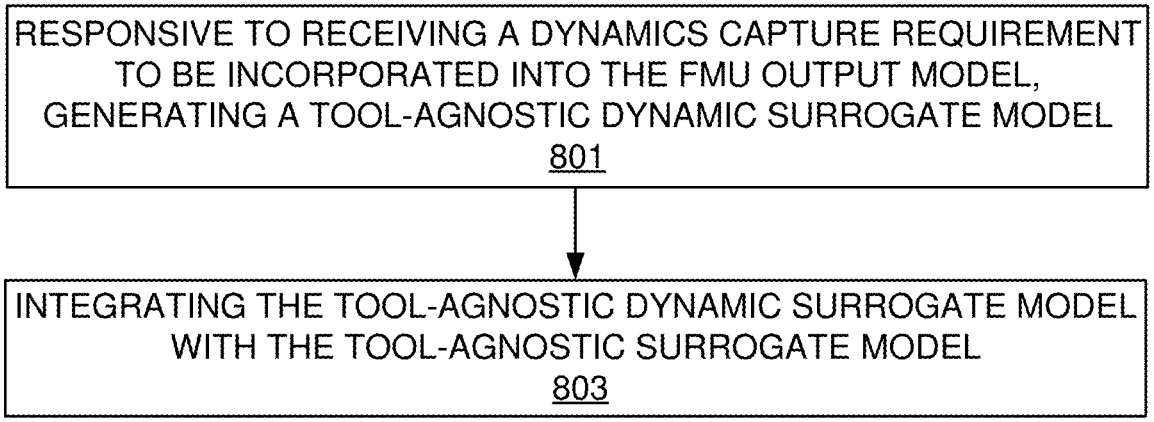

A user may desire a dynamic surrogate model be created. Turning to FIG. 8, in block 801, the processing circuitry 403 may responsive to receiving a dynamic capture requirement to be incorporated into the output LF-FMU 104 model, generate a tool-agnostic dynamic surrogate model 320 referred to in FIG. 3 as a transient model 320. In an alternative embodiment, the processing circuitry 403 may receive a dynamics capture requirement to generate a tool-agnostic dynamic surrogate model 320.

Figure 9:
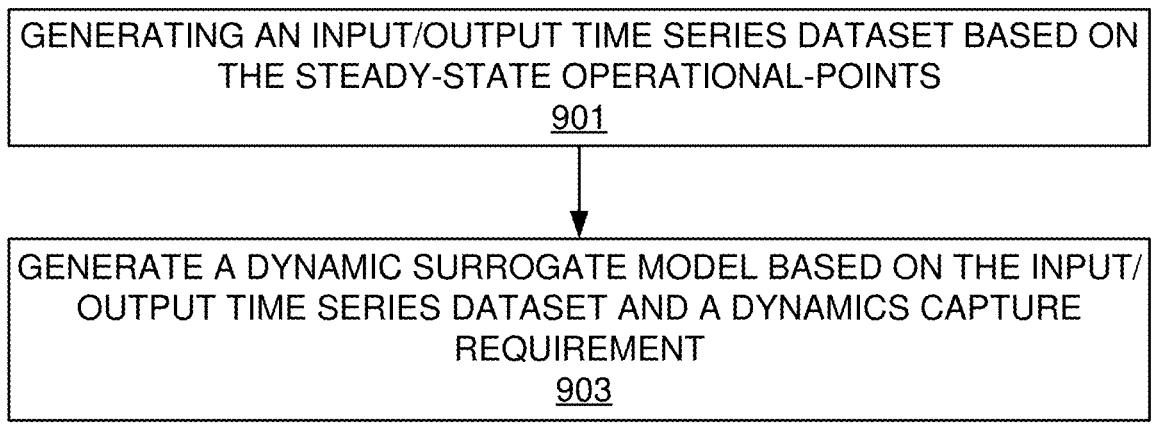

Turning to FIG. 9, operations the processing circuitry 403 may perform in one embodiment of generating the tool-agnostic dynamic surrogate model are illustrated. In block 901, the processing circuitry 403 generates an input/output timeseries dataset based on the steady-state operational-points. In block 903, the processing circuitry 403 generates the dynamic surrogate model based on the input/output timeseries dataset and the dynamics capture requirement.

Returning to FIG. 8, in block 803, the processing circuitry 403 integrates the tool-agnostic dynamic surrogate model 320 with the tool-agnostic steady-state surrogate model 318. The integration may be performed responsive to receiving an indication to integrate the tool-agnostic dynamic surrogate model 320 with the tool-agnostic steady-state surrogate model 318.

In some aspects, the processing circuitry 403 can receive multiple proprietary models as the FF-FMU 100. Responsive to the proprietary model being a plurality of proprietary models, the processing circuitry 403 receives each of the plurality of proprietary models as at least one FF-FMU (100). The plurality of proprietary models may be in series, in parallel, or a combination thereof. The plurality of proprietary models can be a single System Structure and Parameterization (SSP) unit containing one or more input FF-FMUs 100 that can be connected in serial and/or in parallel or a combination thereof. The processing circuitry 403 can implement the surrogate model creation 102 as described above and output the tool-agnostic surrogate model as at least one output LF-FMU 104.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms)

used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit, where upon execution produce a machine, such that the instructions, which are executed via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium, when executed, produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method comprising:
receiving, by a device, a proprietary model as a functional-mockup unit (FMU);
performing, by the device, automated dataset generation on the FMU to create datasets based on design of experiments and input requirements;
determining, by the device, steady-state operational-points;
generating, by the device, a tool-agnostic surrogate model based on the datasets and the steady-state operational-points;
validating, by the device, the tool-agnostic surrogate model based on the datasets,
wherein validating the tool-agnostic surrogate model comprises:
iteratively performing, until the datasets meet a threshold requirement, one or more of:
performing the automated dataset generation,
determining the steady-state operational-points, or
generating the tool-agnostic surrogate model; and
outputting, by the device, the tool-agnostic surrogate model as an output FMU model that is free of licensing requirements of a license for a proprietary model, based on the tool-agnostic surrogate model being validated.

2. The method of claim 1, further comprising:
responsive to any of the input requirements not being part of metadata of the FMU, receiving the input requirements that are not part of the metadata responsive to a user providing the input requirements, the input requirements comprising at least one of an input domain, a model accuracy, and a run-time performance requirement; and
responsive to the model accuracy or the run-time performance requirement not being part of the metadata and not being received, using a pre-defined model accuracy when the model accuracy is not received and a pre-defined run-time performance requirement when the run-time performance requirement is not received.

3. The method of claim 1, wherein performing the automated dataset generation and determining the steady-state operational-points comprises:
generating an input dataset;
identifying operational-point identifications based on the input dataset;
generating an output dataset based on the operational-point identifications; and
creating the datasets based on the operational-point identifications.

4. The method of claim 1, further comprising:
responsive to receiving a dynamics capture requirement to be incorporated into the output FMU model, generating a tool-agnostic dynamic surrogate model.

5. The method of claim 4, further comprising:
integrating the tool-agnostic dynamic surrogate model with the tool-agnostic surrogate model.

6. The method of claim 4, wherein generating the tool-agnostic dynamic surrogate model comprises:
generating a timeseries dataset based on the steady-state operational-points; and
generating the tool-agnostic dynamic surrogate model based on the timeseries dataset and the dynamics capture requirement.

7. The method of claim 1, wherein the FMU comprises receiving each of a plurality of proprietary models as at least one FMU, and
wherein the output FMU model comprises outputting the tool-agnostic surrogate model as at least one output FMU model.

8. A surrogate model node configured to convert a proprietary model to a tool-agnostic surrogate model using a functional mockup interface (FMI) standard, the surrogate model node comprising:
processing circuitry; and
memory coupled with the processing circuitry, wherein the memory includes instructions that when executed by the processing circuitry causes the surrogate model node to:
receive a proprietary model as a functional-mockup unit (FMU) 100;
perform automated dataset generation on the FMU to create datasets based on design of experiments and input requirements;
determine steady-state operational-points;
generate the tool-agnostic surrogate model based on the datasets and the steady-state operational-points;
validate the tool-agnostic surrogate model based on the datasets,
wherein the memory includes instructions that when executed by the processing circuitry causes the surrogate model node to validate the tool-agnostic surrogate model, the surrogate model node to:
iteratively perform, until the datasets meet a threshold requirement, one or more of:
performing the automated dataset generation,
determining the steady-state operational-points, or
generating the tool-agnostic surrogate model; and
output the tool-agnostic surrogate model as an output FMU model that is free of licensing requirements of a license for the proprietary model based on the tool-agnostic surrogate model being validated.

9. The surrogate model node of claim 8, wherein the memory includes further instructions that when executed by the processing circuitry further causes the surrogate model node:
responsive to any of the input requirements not being part of metadata of the FMU, receiving the input requirements that are not part of the metadata responsive to a user providing the input requirements, the input requirements comprising at least one of an input domain, a model accuracy, and a run-time performance requirement; and
responsive to the model accuracy or the run-time performance requirement not being part of the metadata and not being received, using a pre-defined model accuracy when the model accuracy is not received and a pre-defined run-time performance requirement when the run-time performance requirement is not received.

10. The surrogate model node of claim 8, wherein the memory includes instructions that when executed by the processing circuitry causes the surrogate model node to perform the automated dataset generation and determine the steady-state operational-points, the surrogate model node to:
generate an input dataset;
identify operational-point identifications based on the input dataset;
generate an output dataset based on the operational-point identifications; and
create the datasets based on the operational-point identifications.

11. The surrogate model node of claim 8, wherein the memory includes instructions that when executed by the processing circuitry further causes the surrogate model node to:
responsive to receiving a dynamics capture requirement to be incorporated into the output FMU model, generate a tool-agnostic dynamic surrogate model.

12. The surrogate model node of claim 11, wherein the memory includes instructions that when executed by the processing circuitry further causes the surrogate model node to:
integrate the tool-agnostic dynamic surrogate model with the tool-agnostic surrogate model.

13. The surrogate model node of claim 11, wherein in generating the tool-agnostic dynamic surrogate model, the memory includes instructions that when executed by the processing circuitry further causes the surrogate model node to:
generate a timeseries dataset based on the steady-state operational-points; and
generate the tool-agnostic dynamic surrogate model based on the input/output timeseries dataset and the dynamics capture requirement.

14. The surrogate model node of claim 8, wherein as the FMU comprises receiving each of a plurality of proprietary models as at least one FMU and wherein the output FMU model comprises outputting the tool-agnostic surrogate model as at least one output FMU model.

15. A non-transitory computer-readable medium including program code to be executed by processing circuitry of a surrogate model node, whereby execution of the program code causes the surrogate model node to:

receive a proprietary model as a functional-mockup unit (FMU);

perform automated dataset generation on the FMU to create datasets based on design of experiments and input requirements;

determine steady-state operational-points;

generate a tool-agnostic surrogate model based on the datasets and the steady-state operational-points;

validate the tool-agnostic surrogate model based on the datasets, wherein the program code to be executed by processing circuitry of the surrogate model node to validate the tool-agnostic surrogate model, the surrogate model node to:

iteratively perform, until the datasets meet a threshold requirement, one or more of:

performing the automated dataset generation, determining the steady-state operational-points, or generating the tool-agnostic surrogate model; and output the tool-agnostic surrogate model as an output FMU model that is free of licensing requirements of a license for the proprietary model based on the tool-agnostic surrogate model being validated.

16. The non-transitory computer-readable medium of claim 15, including program code to be executed by processing circuitry of the surrogate model node, whereby execution of the program code further causes the surrogate model node to:

responsive to receiving a dynamics capture requirement to be incorporated into the outp FMU model, generate a tool-agnostic dynamic surrogate model.

17. The non-transitory computer-readable medium of claim 16, including program code to be executed by processing circuitry of the surrogate model node, whereby execution of the program code further causes the surrogate model node to:

integrate the tool-agnostic dynamic surrogate model with the tool-agnostic surrogate model.

18. The non-transitory computer-readable medium of claim 16, including program code to be executed by processing circuitry of the surrogate model node, whereby execution of the program code further causes the surrogate model node to:

generate a timeseries dataset based on the steady-state operational-points; and generate the tool-agnostic dynamic surrogate model based on the timeseries dataset and the dynamics capture requirement.

19. The non-transitory computer-readable medium of claim 15, including further program code to be executed by processing circuitry of the surrogate model node, whereby execution of the program code, to perform the automated dataset generation and determine the steady-state operational-points, causes the surrogate model node to:

generate an input dataset;

identify operational-point identifications based on the input dataset;

generate an output dataset based on the operational-point identifications; and create the datasets based on the operational-point identifications.

20. The non-transitory computer-readable medium of claim 15, wherein the FMU comprises receiving each of a plurality of proprietary models as at least one FMU, and wherein the output FMU model comprises outputting the tool-agnostic surrogate model as at least one output FMU model.

* * * * *